(12) United States Patent
Hwang et al.

(10) Patent No.: US 11,760,234 B2
(45) Date of Patent: Sep. 19, 2023

(54) ELECTRICALLY POWERED SLIDING UNIT FOR VEHICLE

(71) Applicants: Hyundai Motor Company, Seoul (KR); KIA Motors Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 266 days.

(21) Appl. No.: 17/168,466

(22) Filed: Feb. 5, 2021

(65) Prior Publication Data

US 2022/0080863 A1 Mar. 17, 2022

(30) Foreign Application Priority Data

Sep. 16, 2020 (KR) .................. 10-2020-0119227

(51) Int. Cl.
*B60N 2/08* (2006.01)
(52) U.S. Cl.
CPC ...................... *B60N 2/08* (2013.01)
(58) Field of Classification Search
CPC ............ B60N 2/015; B60N 2/01508; B60N 2/01516; B60N 2/01525; B60N 2/0155; B60N 2/0702; B60N 2/08; B60N 2/919; B60N 2002/924; B60N 2002/952; B60N 2/0812; B60N 2/0818

(Continued)

(56) References Cited

U.S. PATENT DOCUMENTS 3,636,883 A 1/1972 Wesener
3,696,753 A * 10/1972 Ross ............... B60L 13/003
104/123

(Continued)

FOREIGN PATENT DOCUMENTS

CN 106864345 A 6/2017
DE 10 2009 029 314 A1 8/2010

(Continued)

OTHER PUBLICATIONS

U.S. Office Action dated Sep. 29, 2021, issued in corresponding U.S. Appl. No. 17/167,562.

(Continued)

*Primary Examiner* — Jonathan Liu
*Assistant Examiner* — Guang H Guan
(74) *Attorney, Agent, or Firm* — Morgan, Lewis & Bockius LLP

(57) ABSTRACT

A sliding unit for a vehicle includes: a rail having a bottom surface, both side surfaces and a top surface, the rail configured to extend in a front-rear direction, be bent, and then extend in a left-right direction; a moving part slidably disposed on the rail to slide along the rail to move in the front-rear direction or in the left-right direction; a magnetic force part disposed in the moving part and configured to be locked to or unlocked from the rail through a magnetic force; and ground parts disposed on the moving part, electrically connected to the magnetic force part, and grounded with the rail to supply power from the rail to the magnetic force part.

12 Claims, 2 Drawing Sheets

(58) Field of Classification Search
USPC .......................................... 248/424, 429, 430
See application file for complete search history.

(56) References Cited

U.S. PATENT DOCUMENTS

| | | | |
|---|---|---|---|
| 3,964,206 A | 6/1976 | Bernhard | |
| 4,386,777 A | 6/1983 | Prehodka | |
| 5,170,714 A * | 12/1992 | Katagiri | B29C 51/261 |
| | | | 104/282 |
| 6,101,952 A | 8/2000 | Thornton et al. | |
| 6,191,507 B1 * | 2/2001 | Peltier | G01D 5/2451 |
| | | | 318/135 |
| 6,457,765 B1 | 10/2002 | Bergquist et al. | |
| 6,899,035 B2 | 5/2005 | Zorn et al. | |
| 7,677,629 B2 | 3/2010 | Akiya et al. | |
| 8,362,636 B2 * | 1/2013 | Ling | F03D 13/20 |
| | | | 290/55 |
| 8,720,673 B2 * | 5/2014 | Loecht | B65G 19/02 |
| | | | 198/619 |
| 8,857,763 B2 | 10/2014 | Brand et al. | |
| 8,967,051 B2 | 3/2015 | King et al. | |
| 9,219,359 B2 | 12/2015 | Sekino et al. | |
| 9,381,876 B2 | 7/2016 | Terada et al. | |
| 9,573,536 B2 | 2/2017 | Katou et al. | |
| 9,627,129 B2 | 4/2017 | Abe | |
| 9,783,081 B2 | 10/2017 | Saucier et al. | |
| 10,029,855 B2 * | 7/2018 | Grosskreuz | B65G 54/02 |
| 10,336,559 B2 * | 7/2019 | Koga | B65G 54/02 |
| 10,414,314 B2 | 9/2019 | Leck et al. | |
| 10,604,032 B2 * | 3/2020 | Dry | B60N 2/005 |
| 10,717,374 B2 | 7/2020 | Kim | |
| 10,759,305 B2 * | 9/2020 | Dry | B60R 16/027 |
| 10,807,803 B2 * | 10/2020 | Ragan | B65G 54/02 |
| 11,142,097 B2 * | 10/2021 | Dry | B60R 16/027 |
| 11,396,247 B2 * | 7/2022 | Hwang | B60N 2/06 |
| 11,413,987 B2 * | 8/2022 | Sjostrom | B60N 2/01558 |
| 11,642,987 B2 * | 5/2023 | Hwang | B60N 2/919 |
| | | | 297/344.1 |
| 2007/0158969 A1 | 7/2007 | Walkingshaw | |
| 2010/0236445 A1 | 9/2010 | King et al. | |
| 2013/0074724 A1 | 3/2013 | King et al. | |
| 2018/0334054 A1 | 11/2018 | Higuchi et al. | |
| 2021/0170919 A1 | 6/2021 | Tseng et al. | |
| 2022/0063452 A1 * | 3/2022 | Hwang | B60N 2/0725 |
| 2022/0080863 A1 * | 3/2022 | Hwang | B60N 2/08 |
| 2023/0105498 A1 * | 4/2023 | Hwang | B60N 2/0722 |
| | | | 248/429 |

FOREIGN PATENT DOCUMENTS

| | | |
|---|---|---|
| JP | 2018-134972 A | 8/2018 |
| KR | 10-1997-0036570 A | 7/1997 |
| KR | 20-1999-0012049 U | 4/1999 |
| KR | 10-1125280 B1 | 3/2012 |
| KR | 10-1468617 B1 | 12/2014 |
| KR | 10-2117034 B1 | 6/2020 |

OTHER PUBLICATIONS

Korean Office Action dated Jun. 2, 2022, issued in corresponding Korean Patent Application No. 10-2020-0119227.
Korean Notice of allowance dated Dec. 22, 2022, issued in corresponding Korean Patent Application No. 10-2020-0119227.
German Office Action dated Jun. 7, 2023, issued in corresponding German Patent Application No. 102021201279.5.

* cited by examiner

ELECTRICALLY POWERED SLIDING UNIT FOR VEHICLE

CROSS REFERENCE TO RELATED APPLICATION

The present application claims the benefit of priority to Korean Patent Application No. 10-2020-0119227, filed Sep. 16, 2020 in the Korean Intellectual Property Office, the entire contents of which is incorporated herein for all purposes by this reference.

TECHNICAL FIELD

The present disclosure relates to a sliding unit for a vehicle in which a moving part, to which a seat, a console, a table or the like may be coupled, is movable along a rail extending in a front-rear direction, bent, and then extends in a left-right direction, and the moving part is locked or unlocked on the rail based on a magnetic path of a magnetic force part provided in the moving part.

BACKGROUND

In a vehicle, a seat can be adjusted in a front-rear direction to meet occupant's physical conditions or to secure a space in front of or behind the seat. As a traditional way, the seat slides in the front-rear direction along a rail provided on a floor of the vehicle by a user's manual operation of a lever, and the seat is fixed after sliding. Recently, various electric seats sliding forwardly or backwardly by pressing a button have also been developed. The electric seat mainly requires a drive system and a locking mechanism. Conventional drive systems and locking devices have a complicated structure, occupy a large space accordingly, and also accompany a wiring structure for supplying power.

Thus, the necessity is emerging for an electric rail that is not only capable of easily supplying power, while occupying a minimum space with a simple structure, but also easily applicable to various parts as well as the seat in the vehicle, such as a console.

The contents described as the related art have been provided only to assist in understanding the background of the present disclosure and should not be considered as corresponding to the related art known to those having ordinary skill in the art.

SUMMARY

An object of the present disclosure is to provide a sliding unit for a vehicle in which a locking mechanism is implemented using a magnetic force part, such that a moving part is locked to or unlocked from a rail when sliding along the rail extending in a front-rear direction, bent, and then extending in a left-right direction, while having a simple and slim structure, and the moving part may be coupled to any one of various devices as well as a seat, thereby making it possible to widely apply the sliding unit inside the vehicle.

According to an embodiment of the present disclosure, a sliding unit for a vehicle includes: a rail having a bottom surface, both side surfaces and a top surface, the rail configured to extend in a front-rear direction, be bent, and then extend in a left-right direction; a moving part slidably disposed on the rail to slide along the rail to move in the front-rear direction or in the left-right direction; a magnetic force part disposed in the moving part and locked to or unlocked from the rail through a magnetic force; and ground parts disposed on the moving part, electrically connected to the magnetic force part, and grounded with the rail to supply power from the rail to the magnetic force part.

A plurality of bearing parts may be provided on outer side surfaces of the moving part and supported by the bottom surface, the side surfaces and the top surface of the rail, respectively.

The moving part may be in a shape of a rectangular frame, the magnetic force part may be disposed in an inner space of the frame, and each of the ground parts may be disposed on the frame to face one of the side surfaces of the rail.

The bearing parts may be upper surface bearings located on an upper surface of the moving part, the upper surface bearings may rotate while being supported by the top surface of the rail, and an upper position of the moving part may be regulated by the upper surface bearings when the moving part slides.

The bearing parts may be lower surface bearings located on a lower surface of the moving part, the lower surface bearings may rotate while being supported by the bottom surface of the rail, and a lower position of the moving part may be regulated by the lower surface bearings when the moving part slides.

The bearing parts may be side surface bearings located on side surfaces of the moving part, the side surface bearings may rotate while being supported by the side surfaces of the rail, and left and right positions of the moving part may be regulated by the side surface bearings when the moving part slides.

A fixing part formed of a material allowing magnetism to flow therethrough may be provided on the bottom surface of the rail, and the magnetic force part may be disposed to face the fixing part to form a magnetic path.

The magnetic force part may be locked to the fixing part when the magnetic path is formed both in the magnetic force part and in the fixing part, and the magnetic force part may be unlocked from the fixing part when the magnetic path is formed only in the magnetic force part.

Two or more wires forming a positive electrode and a negative electrode may be connected to each of the ground parts, and power may be supplied to the magnetic force part through the wires while the moving part slides along inner side surfaces of the rail.

The ground parts may be arranged on outer side surfaces of the moving part at points spaced apart from each other, and a point at which one of the ground parts is grounded with the rail may be switched at a bent portion of the rail when the moving part slides.

A slit hole may be formed in the top surface of the rail, a rail cover may be provided to extend along the rail, and a connection part may be provided above the rail cover while penetrating through the slit hole to be connected to the moving part.

The rail may be provided on a floor of the vehicle, and a seat, a console or a table may be coupled to the connection part to allow the seat, the console or the table to slide along the rail on the floor of the vehicle.

The rail may be provided in a shape of a rectangular ring on a floor of the vehicle, and the moving part may have a rectangular shape and slide in the front-rear direction or in the left-right direction along the rail on the floor of the vehicle.

A seat, a console or a table may be coupled to the moving part to allow the seat, the console or the table to slide in the front-rear direction or in the left-right direction along the rail on the floor of the vehicle.

DETAILED DESCRIPTION OF THE EMBODIMENTS

Figure 1:
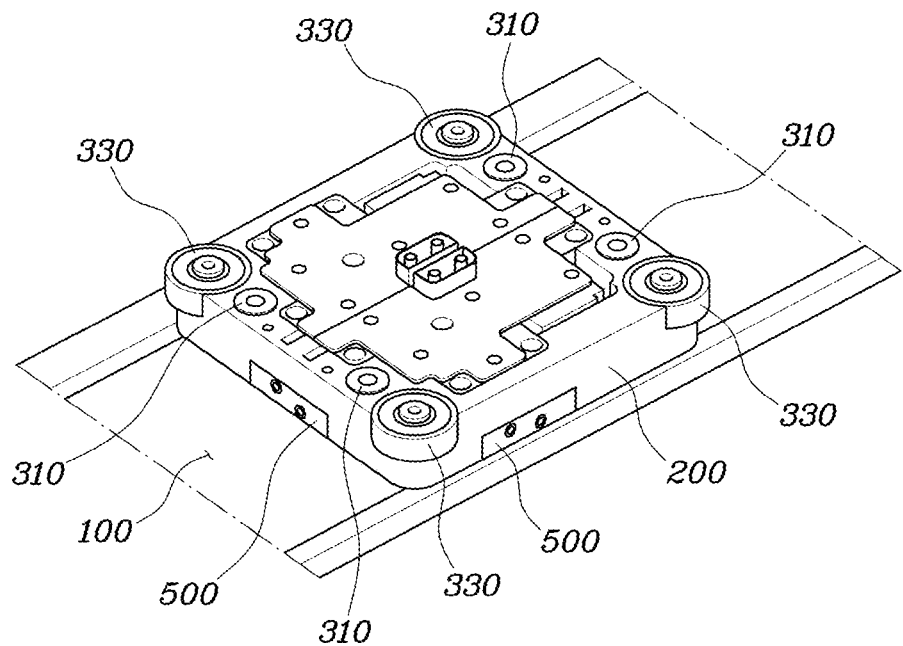
FIG. 1 is a view illustrating a moving part seated on a rail in a sliding unit for a vehicle according to an embodiment of the present disclosure.
Figure 2:
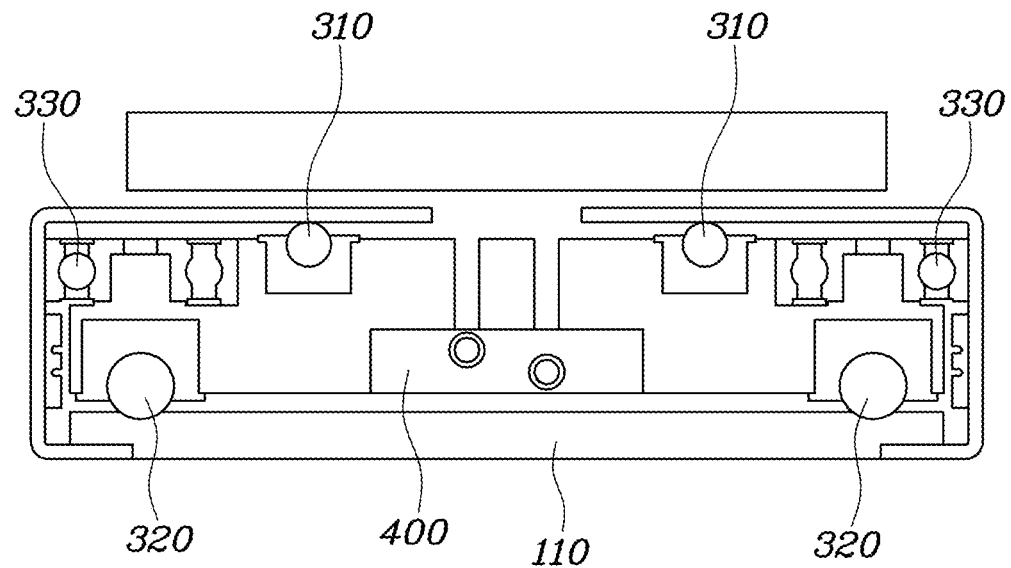
FIG. 2 is a side view illustrating the moving part in the sliding unit for a vehicle according to an embodiment of the present disclosure.
Figure 3:
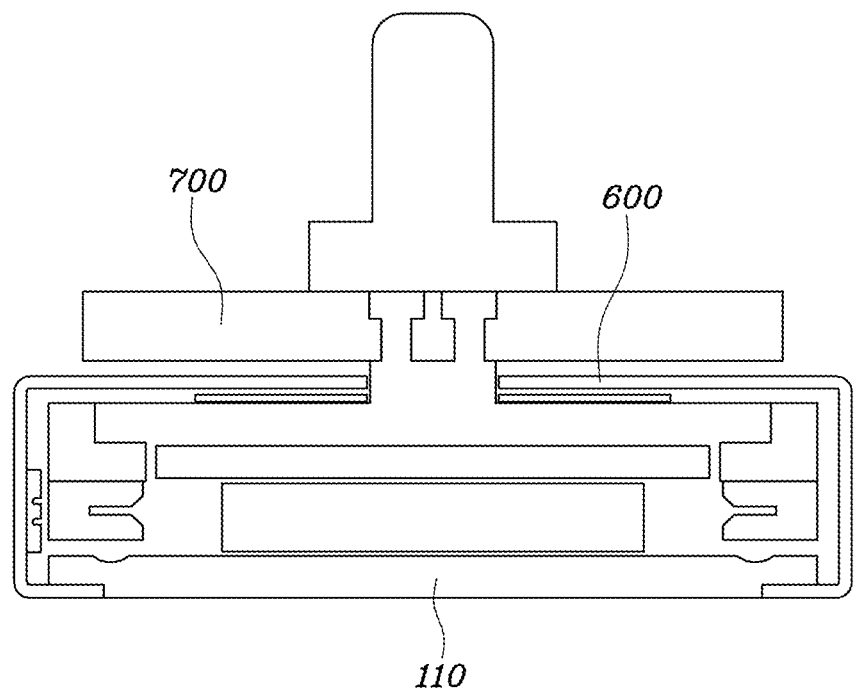
FIG. 3 is a side view illustrating a rail cover and a connection part in the sliding unit for a vehicle according to an embodiment of the present disclosure.
Figure 4:
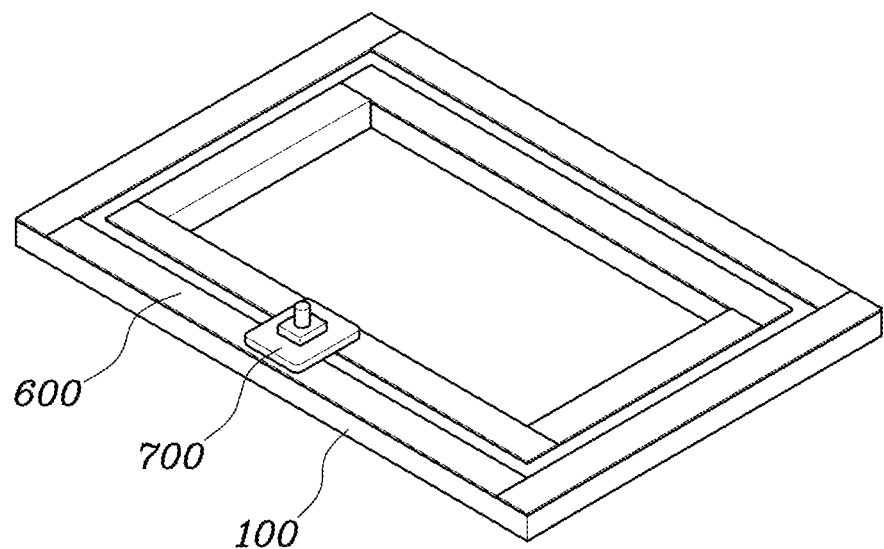
FIG. 4 is a view illustrating the rail that is in a shape of a rectangular ring and the moving part seated on the rail in the sliding unit for a vehicle according to an embodiment of the present disclosure.

FIG. 1 is a view illustrating a moving part seated on a rail in a sliding unit for a vehicle according to an embodiment of the present disclosure. FIG. 2 is a side view illustrating the moving part in the sliding unit for a vehicle according to an embodiment of the present disclosure. FIG. 3 is a side view illustrating a rail cover and a connection part in the sliding unit for a vehicle according to an embodiment of the present disclosure. FIG. 4 is a view illustrating the rail that is in a shape of a rectangular ring and the moving part seated on the rail in the sliding unit for a vehicle according to an embodiment of the present disclosure.

FIG. 1 is a view illustrating a moving part seated on a rail in a sliding unit for a vehicle according to an embodiment of the present disclosure. FIG. 2 is a side view illustrating the moving part in the sliding unit for a vehicle according to an embodiment of the present disclosure. The sliding unit for a vehicle according to an embodiment of the present disclosure includes: a rail 100 having a bottom surface, both side surfaces and a top surface, the rail 100 extending in a front-rear direction, bent, and then extending in a left-right direction; a moving part 200 seated on the rail 100 to slide along the rail 100 to move in the front-rear direction or in the left-right direction; a magnetic force part 400 provided in the moving part 200 and locked to or unlocked from the rail 100 through a magnetic force; and ground parts 500 provided on the moving part 200, electrically connected to the magnetic force part 400, and grounded with the rail 100 to supply power from the rail 100 to the magnetic force part 400. In addition, a plurality of bearing parts 310, 320 and 330 may be provided on outer side surfaces of the moving part 200, and the plurality of bearing parts 310, 320 and 330 may be supported by the bottom surface, the side surfaces and the top surface of the rail 100, respectively. The rail 100 may extend and be bent in a predetermined direction, such as a length direction of the vehicle or a width direction of the vehicle, on a floor of the vehicle, such that a closed path is formed.

The sliding unit for a vehicle according to an embodiment of the present disclosure is capable of minimizing a space occupied by the rail 100, while having a simple structure, by employing a locking mechanism using the magnetic force part 400, thereby efficiently using a space inside the vehicle. Specifically, a conventional locking mechanism of a rail is generally in a lead screw using type or in a forking type. When a seat is locked in this manner, the rail has an excessive height of about 47 mm or about 57 mm. When the height of the rail is excessive, a large portion of the limited space on the floor of the vehicle is occupied by the rail, making it difficult to efficiently use the space. Thus, the sliding unit for a vehicle according to an embodiment of the present disclosure employs a new locking mechanism using the magnetic force part to implement the rail in a slim structure such that the rail has a height of about 30 mm.

In the sliding unit for a vehicle according to an embodiment of the present disclosure, the moving part 200 may be in a shape of a rectangular frame. The magnetic force part 400 may be disposed in an inner space of the frame, and each of the ground parts 500 may be disposed on the frame to face one of the side surfaces of the rail 100. The number of ground parts 500 may be four, and each one of the four ground parts 500 may be disposed on a respective surface of the rectangular frame of the moving part 200. When the respective surface of the rectangular frame of the moving part 200 is in contact with the side surface of the rail 100, the ground part 500 is grounded with the rail 100 to supply power to the magnetic force part 400.

In addition, in the sliding unit for a vehicle according to an embodiment of the present disclosure, the bearing parts may be upper surface bearings 310 located on an upper surface of the moving part 200. The upper surface bearings 310 may rotate while being supported by the top surface of the rail 100, and an upper position of the moving part 200 may be regulated by the upper surface bearings 310 when the moving part 200 slides. The number of upper surface bearings 310 may be four, and each one of the four upper surface bearings 310 may be disposed at a respective vertex on the upper surface of the moving part 200 that is in the shape of the rectangular frame and may rotate while being supported by the rail cover covering the top surface of the rail, thereby regulating the upper position of the moving part 200 when the moving part 200 slides.

On the other hand, in the sliding unit for a vehicle according to an embodiment of the present disclosure, the bearing parts may be lower surface bearings 320 located on a lower surface of the moving part 200. The lower surface bearings 320 may rotate while being supported by the bottom surface of the rail 100, and a lower position of the moving part 200 may be regulated by the lower surface bearings 320 when the moving part 200 slides. The number of lower surface bearings 320 may be four, and each one of the four lower surface bearings 320 may be disposed at a respective vertex on the lower surface of the moving part 200 that is in the shape of the rectangular frame and may rotate while being supported by the bottom surface of the rail 100 or a fixing part 110, thereby regulating the lower position of the moving part 200 when the moving part 200 slides.

In addition, in the sliding unit for a vehicle according to an embodiment of the present disclosure, the bearing parts may be side surface bearings 330 located on side surfaces of the moving part 200. The side surface bearings 330 may rotate while being supported by the side surfaces of the rail 100, and left and right positions of the moving part 200 may be regulated by the side surface bearings 330 when the moving part 200 slides. The number of side surface bearings 330 may be four, and each one of the four side surface bearings 330 may be disposed at a respective vertex on the side surfaces of the moving part 200 that is in the shape of the rectangular frame and may rotate while being supported by the side surface of the rail 100, thereby regulating front and rear positions or left and right positions of the moving part 200 when the moving part 200 slides, and preventing eccentricity between the front and the rear of the moving part 200 or between the left and the right of the moving part 200.

In the sliding unit for a vehicle according to an embodiment of the present disclosure, the fixing part 110 formed of a material allowing magnetism to flow therethrough may be provided on the bottom surface of the rail 100, and the magnetic force part 400 may be disposed to face the fixing part 110 to form a magnetic path. In the sliding unit for a vehicle according to an embodiment of the present disclosure, the magnetic force part 400 may be locked to the fixing part 110 when the magnetic path is formed both in the magnetic force part 400 and in the fixing part 110, and the magnetic force part 400 may be unlocked from the fixing part 110 when the magnetic path is formed only in the magnetic force part 400. The magnetic force part 400 may be ring-shaped and in contact with the fixing part 110. The magnetic force part 400 may include a fixed permanent magnet provided therein close to the fixing part 110 and an electromagnet provided therein opposite to the fixing part 110, and the magnetic force part 400 may be locked to or unlocked from the fixing part 110 by changing a polarity of the electromagnet. In other words, the magnetic force part 400 forms the magnetic path when a current is applied to the electromagnet, and the magnetic path formed in the magnetic force part 400 is changed by changing a magnetic pole of the electromagnet.

Specifically, when the current is applied to the electromagnet such that the electromagnet has the same magnetic pole at a portion adjacent to the fixed permanent magnet as the adjacent fixed permanent magnet, the magnetic path is formed to pass through both the magnetic force part 400 and the fixing part 110, and accordingly, the magnetic force part 400 is locked to the fixing part 110 to fix the moving part 200 to the rail 100. When the current is applied to the electromagnet such that the electromagnet has a different magnetic pole at a portion adjacent to the fixed permanent magnet from the adjacent fixed permanent magnet, the magnetic path is formed to pass only through the magnetic force part 400 without passing through the fixing part 110, and accordingly, the magnetic force part 400 is unlocked from the fixing part 110 to release the moving part 200 from the rail 100.

In addition, even when the current is stopped from being applied after the magnetic force part 400 is locked to or unlocked from the fixing part 110 as the magnetic path is formed by applying the current to the electromagnet, the magnetic force part 400 maintains the pre-formed magnetic path, and the magnetic force part 400 remains locked to or unlocked from the fixing part 110. Therefore, when the locking mechanism is implemented using the magnetic force part 400 in the rail, the current supply to the magnetic force part 400 is required only at a locked or unlocked moment, thereby minimizing power consumption.

In the sliding unit for a vehicle according to an embodiment of the present disclosure, two or more wires forming a positive electrode and a negative electrode may be connected to the ground parts 500, and power may be supplied to the magnetic force part 400 through the wires while the moving part 200 slides along inner side surfaces of the rail 100. In the sliding unit for a vehicle according to an embodiment of the present disclosure, the ground parts 500 may be arranged on outer side surfaces of the moving part 200 at points spaced apart from each other, and a point at which one of the ground parts 500 is grounded with the rail 100 may be switched at a bent portion of the rail 100 when the moving part 200 slides.

Specifically, in the sliding unit for a vehicle according to an embodiment of the present disclosure, while the moving part 200 is in the shape of the rectangular frame and the rail 100 is in the shape of the rectangular ring having four bent portions, the number of ground parts 500 may be four, each one of the four ground parts 500 being disposed on a respective surface of the rectangular frame of the moving part 200. When the respective surface of the rectangular frame of the moving part 200 is in contact with the side surface of the rail 100, the ground part 500 is grounded with the rail 100 to supply power to the magnetic force part 400. Therefore, even though a sliding direction of the moving part 200 is changed at each bent portion of the rail 100, any side surface of the moving part 200 is in contact with the side surface of the rail 100 on which a power supplier for supplying power from a power unit of the vehicle is provided, thereby continuously supplying the power to the magnetic force part 400 when the moving part 200 slides. However, the ground parts 500 are in contact with two side surface points of the rail 100 at the bend portion of the rail 100. In this regard, the moving part 200 includes a voltage sensor and a switch, such that the voltage sensor may check a voltage coming from each side surface and the switch may shut off one of two powers that is not for a side surface point of the rail 100 toward which the moving part 200 slides, thereby shifting the point at which one of the ground parts 500 is grounded with the rail 100.

FIG. 3 is a side view illustrating a rail cover and a connection part in the sliding unit for a vehicle according to an embodiment of the present disclosure. FIG. 4 is a view illustrating the rail that is in the shape of the rectangular ring and the moving part seated on the rail in the sliding unit for a vehicle according to an embodiment of the present disclosure. In the sliding unit for a vehicle according to an embodiment of the present disclosure, a slit hole may be formed in the top surface of the rail 100, a rail cover 600 may be provided to extend along the rail 100, and a connection part 700 may be provided above the rail cover 600 while penetrating through the slit hole to be connected to the moving part 200.

Specifically, the moving part 200, the magnetic force part 400, and the plurality of bearing parts 310, 320 and 330 occupying a minimum space may be located in an inner space of the rail 100, and the moving part 200 may be connected to the connection part 700 penetrating through the slit hole provided in the rail cover 600, thereby implementing the rail 100 in a simple and slim manner.

In the sliding unit for a vehicle according to an embodiment of the present disclosure, the rail 100 may be provided on the floor of the vehicle, and a seat, a console or a table may be coupled to the connection part 700 to allow the seat, the console or the table to slide along the rail 100 on the floor of the vehicle. The seat, the console or the table, which is coupled to the connection part 700 connected to the moving part 200, may move together with the moving part 200 when the moving part 200 slides in the front-rear direction or in the left-right direction along the rail 100. The seat, the console or the table may be locked to or unlocked from the fixing part 110 using the magnetic force part 400. In addition, the seat, the console or the table, when applied, may be electrically connected to the ground part 500 to receive power from the ground part 500, which is grounded to the rail 100 connected to the power unit of the vehicle.

In addition, in the sliding unit for a vehicle according to an embodiment of the present disclosure, the rail 100 may be provided in the shape of the rectangular ring on the floor of the vehicle, and the moving part 200 may have the rectangular shape and slide in the front-rear direction or in the left-right direction along the rail 100 on the floor of the vehicle.

In the sliding unit for a vehicle according to an embodiment of the present disclosure, the seat, the console or the table may be coupled to the moving part 200 to allow the seat, the console or the table to slide in the front-rear direction or in the left-right direction along the rail on the floor of the vehicle. While the moving part 200 slides in the front-rear direction or in the left-right direction along the rail 100 that is in the shape of the rectangular ring, the moving part 200 may be grounded to the power supplier located on the side surface of the rail 100, through the ground part 500 located on the respective side surface of the moving part 200 that is in the shape of rectangular ring, to continuously supply power to the magnetic force part 400 or to the seat, the console or the table coupled to an upper end of the moving part 200.

As described above, the simple and slim structure of the sliding unit for a vehicle according to an embodiment of the present disclosure makes it possible to implement not only the seat but also another in-vehicle equipment such as the console or the table to be coupled to the upper end of the rail 100 in a simple manner so as to slide along the rail 100. Furthermore, if autonomous vehicles are commonly used in the future, the concept of driver's seat will gradually disappear and the necessity of utilizing a space inside the vehicle will emerge. It is expected that, if the sliding unit for a vehicle according to an embodiment of the present disclosure is used, it will be easy to secure a necessary space by simply sliding equipment in the vehicle, such as the seat, the console or the table, in the front-rear direction or in the left-right direction.

In the sliding unit for a vehicle according to the present disclosure, the locking mechanism is implemented using the magnetic force part, such that the moving part may be locked to or unlocked from the rail when sliding along the rail extending in the front-rear direction, bent, and then extending in the left-right direction, while having a simple and slim structure, and the moving part may be coupled to any one of various devices as well as the seat, thereby making it possible to widely apply the sliding unit inside the vehicle.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A sliding unit for a vehicle, the sliding unit comprising:
   a rail having a bottom surface, both side surfaces and a top surface, the rail configured to extend in a front-rear direction, be bent, and then extend in a left-right direction;
   a fixing part disposed on the bottom surface of the rail and composed of a material allowing magnetism to flow through the fixing part;
   a moving part having a rectangular shape and slidably disposed on the rail to slide along the rail to move in the front-rear direction or in the left-right direction;
   a magnetic force part disposed in the moving part and configured to be locked to or unlocked from the rail through a magnetic force generated between the fixing part and the magnetic force part; and
   ground parts disposed on outer side surfaces of the moving part, spaced apart from each other, and electrically connected to the magnetic force part,
   wherein each of the ground parts is disposed on a respective one of the outer side surfaces of the moving part and is configured to be grounded with the rail to supply power from the rail to the magnetic force part when the respective one of the outer side surfaces of the moving part is in contact with one of the side surfaces of the rail, and
   wherein a point at which one of the ground parts is grounded with the rail is switched at a bent portion of the rail when the moving part slides.

2. The sliding unit of claim 1, wherein a plurality of bearing parts are disposed on the moving part, and supported by the bottom surface, the side surfaces and the top surface of the rail, respectively.

3. The sliding unit of claim 2, wherein the magnetic force part is disposed in an inner space of the moving part, and each of the ground parts is disposed on the moving part to face one of the side surfaces of the rail.

4. The sliding unit of claim 2, wherein the plurality of bearing parts include upper surface bearings located on an upper surface of the moving part, and
   wherein the upper surface bearings are configured to:
      rotate while being supported by the top surface of the rail, and
      adjust a vertical movement of the moving part so as to regulate an upper position of the moving part when the moving part slides.

5. The sliding unit of claim 4, wherein the plurality of bearing parts further include lower surface bearings located on a lower surface of the moving part, and
   wherein the lower surface bearings are configured to:
      rotate while being supported by the bottom surface of the rail, and
      adjust the vertical movement of the moving part so as to regulate a lower position of the moving part when the moving part slides.

6. The sliding unit of claim 2, wherein the plurality of bearing parts include side surface bearings located on the outer side surfaces of the moving part, and
   wherein the side surface bearings are configured to:
      rotate while being supported by the side surfaces of the rail, and
      adjust a lateral movement of the moving part so as to regulate left and right positions of the moving part when the moving part slides.

7. The sliding unit of claim 1, wherein the magnetic force part is disposed to face the fixing part to define a magnetic path.

8. The sliding unit of claim 7, wherein the magnetic force part is configured to be locked to the fixing part when the magnetic path is formed both in the magnetic force part and in the fixing part, and
   the magnetic force part is configured to be unlocked from the fixing part when the magnetic path is formed only in the magnetic force part.

9. The sliding unit of claim 1, wherein the rail includes a slit hole defined in the top surface of the rail,
   wherein a rail cover extends along the rail, and
   wherein a connection part is disposed above the rail cover and extends through the slit hole to be connected to the moving part.

10. The sliding unit of claim 9, wherein the rail is configured to be disposed on a floor of the vehicle, and
    wherein the connection part is configured to couple an object thereon to slide with the moving part along the rail on the floor of the vehicle.

11. The sliding unit of claim 1, wherein the rail has a rectangular ring shape and is configured to be disposed on a floor of the vehicle, and wherein the moving part is configured to slide in the front-rear direction or in the left-right direction along the rail on the floor of the vehicle.

12. The sliding unit of claim 11, wherein the moving part is configured to couple an object thereon to allow the object to slide with the moving part in the front-rear direction or in the left-right direction along the rail on the floor of the vehicle.

* * * * *